US009299208B2

(12) United States Patent
Wessels

(10) Patent No.: US 9,299,208 B2
(45) Date of Patent: Mar. 29, 2016

(54) METHOD, CONTROL UNIT FOR A DEVICE, AND DEVICE PROVIDED WITH A CONTROL UNIT

(75) Inventor: Hendrikus Christinus Maria Wessels, Uithoom (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 56 days.

(21) Appl. No.: 13/444,598

(22) Filed: Apr. 11, 2012

(65) Prior Publication Data

US 2012/0251680 A1 Oct. 4, 2012

Related U.S. Application Data

(63) Continuation of application No. PCT/NL2010/050664, filed on Oct. 8, 2010.

(30) Foreign Application Priority Data

Oct. 16, 2009 (NL) ...................................... 2003662

(51) Int. Cl.
*A47J 31/44* (2006.01)
*G07F 9/02* (2006.01)
*G07F 13/10* (2006.01)

(52) U.S. Cl.
CPC ................ *G07F 9/026* (2013.01); *G07F 13/10* (2013.01)

(58) Field of Classification Search
CPC ................................. G07F 13/10; G07F 9/026
USPC ............................................. 99/285; 426/231
See application file for complete search history.

(56) References Cited

U.S. PATENT DOCUMENTS 7,274,803 B1 * 9/2007 Sharma et al. ................ 382/107
2002/0190960 A1 * 12/2002 Kuo et al. ...................... 345/173
2009/0116692 A1 * 5/2009 Paul et al. ...................... 382/103
2011/0036452 A1 * 2/2011 Schnyder ........................ 141/83

FOREIGN PATENT DOCUMENTS

EP 1 780 620 5/2007
EP 1 909 623 4/2008
EP 1 992 263 11/2008
JP 2005 071208 3/2005
JP 2005 184339 7/2005
KR 2008 0041760 5/2008
WO WO-2005 017839 2/2005
WO WO-2007 003062 1/2007
WO WO 2007048492 A1 * 5/2007

OTHER PUBLICATIONS

International Search Report for International Application No. PCT/NL2010/050664, mail date Feb. 4, 2011, 3 pages.

* cited by examiner

*Primary Examiner* — Jianying Atkisson
(74) *Attorney, Agent, or Firm* — Foley & Lardner LLP

(57) ABSTRACT

A control unit for an automatic device for preparing a beverage is provided with an input which enables the user to choose from a plurality of formulations a formulation for the beverage to be prepared. The control unit is provided with an operating unit for controlling a preparation unit of the automatic device. The input comprises an image input for visually observing the user and for generating image signals which are representative of the visual observation. The operating unit is arranged for generating control signals for the preparation unit of the automatic device as a reaction to the image signals.

7 Claims, 12 Drawing Sheets

METHOD, CONTROL UNIT FOR A DEVICE, AND DEVICE PROVIDED WITH A CONTROL UNIT

CROSS-REFERENCE TO RELATED APPLICATIONS

The present application is a continuation of International Patent Application Serial No. PCT/NL2010/050664 filed on Oct. 8, 2010; which claimed priority to Netherlands Application No. NL 2003662 filed on Oct. 16, 2009, all of which are hereby incorporated herein by reference in their entireties.

BACKGROUND

The present invention relates to a method for controlling an automatic device for preparing a beverage.

The present invention further relates to a control unit for a device for preparing a beverage.

The present invention furthermore relates to a device provided with such a control unit.

Known are devices for preparing beverages provided with a touch-sensitive image display panel, where the image display panel shows a hierarchical menu structure, whereby the user by touching parts from the presented menu chooses step-by-step the composition of the beverage to be dosed. In the main menu the user can choose from, for example, "coffee", "tea", "soup". After selection of one of these options, a new menu appears, in which the user can give a further specification of the selected beverage. If the user makes the selection of, for example, "coffee", thereupon a menu appears in which a choice can be made from the options "with sugar", "with milk", "with sugar and milk", etc. After a choice has been made from these options, in a menu thereupon appearing a choice can be made from amounts of these additions.

EP1909623 B1 describes an automatic device for preparing hot beverages provided with a control panel with an input element and a display element. When the user movingly touches the input element, this results in a scrolling of the presented menu in the image display element. It has appeared that collectively used devices for dosing beverages are a source of transmission of infectious diseases, such as common cold and flu.

It is an object of the invention to provide a control unit for a device for dosing beverages that does not have these disadvantages.

It is a further object of the invention to provide a device that is provided with such a control unit.

It is a further object of the invention to provide a method for controlling an automatic device for preparing a beverage.

SUMMARY

Accordingly, according to a first aspect of the present invention, there is provided a control unit for an automatic device for preparing a beverage, which control unit is provided with an input means which enables a user to choose from a plurality of formulations a formulation for the beverage to be prepared, wherein the control unit is provided with an operating unit for controlling the automatic device, wherein the input means comprises an image input means for visually observing the user and for generating image signals which are representative of the visual observation and wherein the operating unit is arranged for generating control signals for the automatic device as a reaction to the image signals, wherein from the generated image signals an extent of movement of the user is determined and the operating unit only prompts the automatic device to prepare a beverage if the determined movement satisfies minimum requirements.

This is surprising, in view of the fact that it is actually a trend in designing user interfaces to provide for operation of equipment with as little effort as possible. As the control unit according to the invention sets relatively high requirements on the movement to be determined, it stimulates the worker to move more than usual. Especially in office environments where a great deal of sedentary work is done, this is highly beneficial to health.

With the aid of the image input means, users can indicate a desired formulation in a noncontact manner, which obviates users touching the device, so that no pathogens can be transmitted by the device.

The image input means can be, for example, a camera, with the image signals giving a two-dimensional representation of the image observed by the camera. A still more complete observation can be obtained by an operating unit that is provided with more than one camera. The operating unit can generate control signals from the generated image signals using image processing and pattern recognition algorithms. Image processing and pattern recognition algorithms are known per se and are used, for example, in photo cameras for determining the location of a face, in security systems for detecting persons and the like.

It is not necessary that a complete image of the user be obtained. In an embodiment, the image input means comprises, for example, sensors each detecting presence in a respective zone. In that case, the user can control the device by moving through those zones.

In a variant of this embodiment, for the prompting of the preparation of a beverage, at a minimum an overall vertical movement of the user is required.

Although any sufficient extent of movement contributes to the user's health, especially vertical movements require relatively much energy in that gravity needs to be overcome, and are hence very favorable.

In an embodiment of the control unit according to the first aspect of the invention, the operating unit has an indication unit for calculating from the image signals an indication of energy spent by the user in providing the input.

The indication can be calculated, for example, from the extent to which the user moves. According as a more complete image of the user is obtained, a more accurate indication can be obtained of the energy spent by the user in providing the input. The display of this indication stimulates the user in performing movements.

An embodiment of the control unit according to the first aspect of the invention is furthermore provided with visual display means for showing possible choices for the formulations of the beverage to be prepared by the device, whereby the user makes a selection from the possibilities shown through movements.

The user can, for example, select ingredients shown on the display means by moving from left to right with respect to the automatic device and jumping. The visual display means enhance the appeal of the device and hence the willingness of the user to physically exert himself to achieve the desired result.

Automatic devices provided with such visual display means may also be highly advantageously coupled with each other to form a group of at least a first and a second automatic device. The image input means of the first automatic device is then coupled with the visual display means of the second automatic device and vice versa.

Automatic devices for preparing beverages are often a meeting point where workers of a company or institution happen upon each other and consult with each other. By coupling the automatic devices according to this embodiment, it is possible to make direct contact also with workers who have gathered at another automatic device. The image input means present in the device according to the invention is then used for a second purpose. In a practical embodiment, there is also an auditory coupling between the devices, so that the respective workers can speak with each other.

An embodiment of a control unit according to the first aspect of the invention is furthermore provided with acoustic display means for auditorily displaying the result of input provided by the user.

The acoustic display means can then reproduce, for example, sounds that are associated with the preparation and the pouring of beverages, for example, the sound of a cup being placed on a saucer, of coffee being poured into the cup and of a lump of sugar falling into it. The auditory representation enhances the appeal of the device and hence the willingness of the user to physically exert himself to achieve the desired result. The acoustic display means may be arranged, for example, in lieu of or together with the visual display means.

According to a second aspect of the invention, there is provided an automatic device for preparing a beverage provided with a control unit according to any one of the above-mentioned embodiments.

According to a third aspect of the invention, there is provided a method for controlling an automatic device for preparing a beverage, comprising:

visually observing a user of the device, generating image signals which are representative of the visual observation, generating control signals for the automatic device as a reaction to the image signals, preparing a beverage according to a formulation from a plurality of formulations depending on the generated control signals.

BRIEF DESCRIPTION OF THE DRAWINGS

These and other aspects according to the present invention are elucidated in more detail on the basis of the drawings. In the drawings.

DESCRIPTION OF EXEMPLARY EMBODIMENTS

Figure 1:
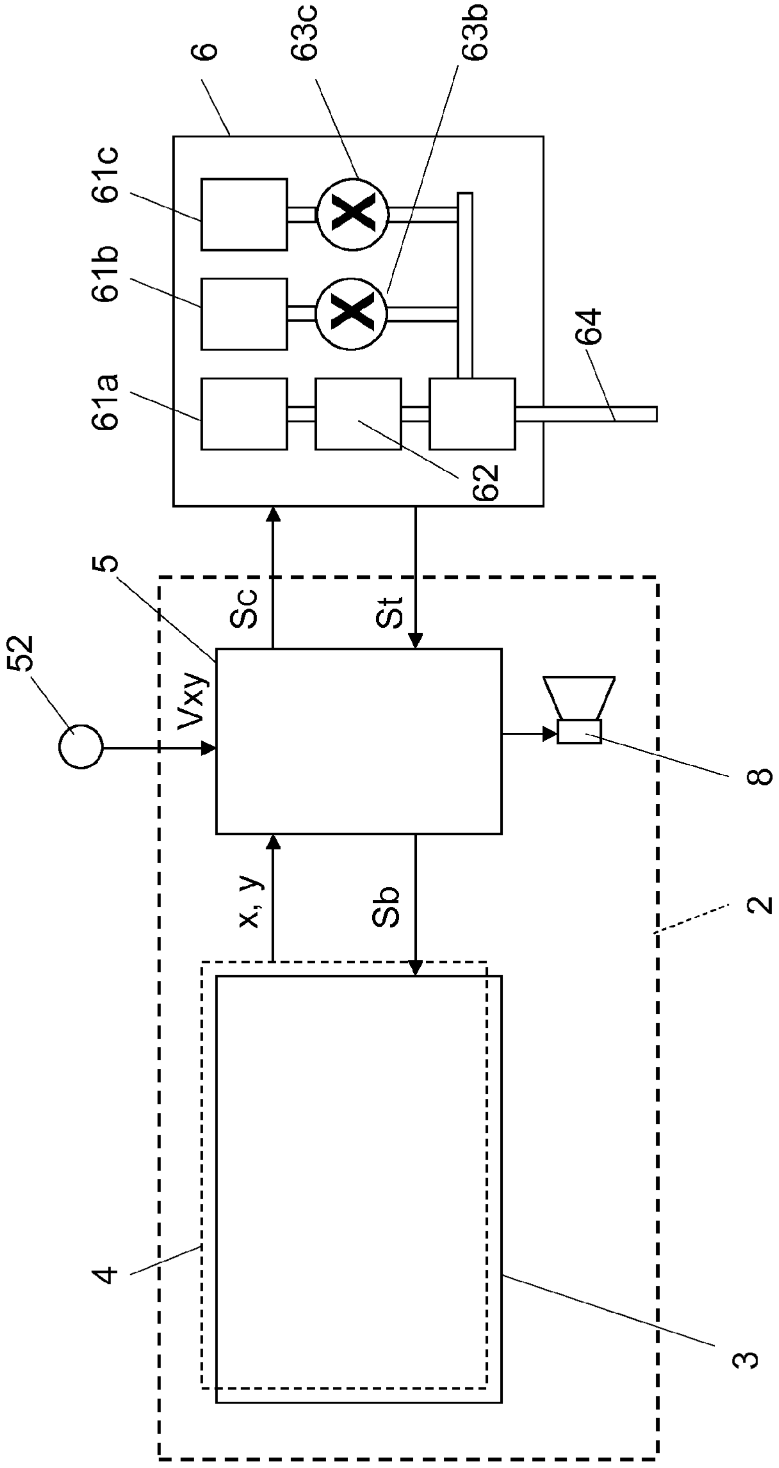
FIG. 1 shows schematically a first embodiment of an automatic device 1 according to the invention for preparing a beverage.

In the following detailed description numerous specific details are set out to provide for a thorough understanding of the present invention. It will be clear to the skilled person that these details are not essential to the present invention. In other instances, generally known methods, procedures and components are not described in detail to thereby avoid more essential aspects of the invention being veiled.

It will be clear to the skilled person that the terms “first”, “second”, “third” in this description can be used to distinguish parts from each other, without thereby indicating any priority. Hence, a first element, component, area, field, module, etc., could also be called a second element, component, area, field, module, etc., without departing from the scope of protection of the present application.

In the drawings, parts are normally not shown to scale. In some instances, parts are shown in a magnified representation for clarity.

Unless indicated otherwise, all terms have the meaning given to them by the person skilled in the art of the present invention. Further, terms such as they are defined in commonly used reference works and dictionaries are understood to be interpreted in accordance with their meaning in the context of the technical field relevant in this case and not to be interpreted in an idealized or unduly formal sense, unless expressly indicated otherwise. In the event of a difference in interpretation of a term, the interpretation given to it by the present application shall be decisive.

Corresponding parts have mutually corresponding reference numerals.

FIG. 1 shows schematically a first embodiment of an automatic device 1 for preparing a beverage. The device 1 is provided with a preparation unit 6 and with a control unit 2. The preparation unit 6 is arranged for preparing a beverage according to a formulation that can be chosen from a plurality of formulations. The preparation unit 6 can prepare, for example, a plurality of beverages, such as water, tea, coffee, chocolate milk and soup. In a practical embodiment, the beverages can be provided with additions, such as sugar, milk and aromas. If desired, also a temperature of the beverage to be prepared can be set. In an embodiment, the preparation unit 6 is provided with inter alia holders 61*a*, 61*b*, 61*c* for storage of coffee, sugar and milk, and the like. The embodiment shown is furthermore provided with a heating unit 62, dosing valves 63*b*, 63*c* and a beverage outlet 64.

The control unit 2 is provided with a visual display means, here an LCD screen 3, and an input means 52 which enables a user to choose from a plurality of formulations a formulation for the beverage to be prepared.

The control unit 2 is equipped with an operating unit 5 for controlling the automatic device. The input means 52 comprises an image input means, in this case a camera for visually observing the user and for generating image signals Vxy which are representative of the visual observation. In this case, the image signals Vxy of the camera give a two-dimensional representation of the image observed. The operating unit 5 is arranged for generating control signals Sc for the preparation unit 6 as a reaction to the image signals Vxy. In the embodiment shown, besides the camera 52, a second input means 4 is present in the form of a transparent touch-sensitive panel which is arranged on the display panel 3. Upon touching, the input means 4 delivers a position signal x,y which is indicative of the position where the display panel 3 has been touched. If desired, the user can thereby operate the automatic device in a different manner as well, for example, through designation of selection fields on the basis of a menu shown on the display panel.

The operating unit 5 is furthermore arranged for displaying by means of the display panel 3 a visually observable reaction to designations provided by the user, and for controlling a preparation unit 6 of the automatic device 1. To this end, the operating unit 5 controls the display panel with an image control signal Sb. The operating unit 5 controls the preparation unit with control signals Sc. In addition, the operating unit 5 can receive condition signals St from the preparation unit 6 which are indicative of the condition of the preparation unit. The condition signals St can indicate, for example, the filling degree of the holders 61*a*, 61*b*, 61*c*, or the height of a temperature reached by the heating unit 62. The control unit 2 is provided with acoustic display means 8 for auditorily representing the result of input provided by the user.

Figure 2:
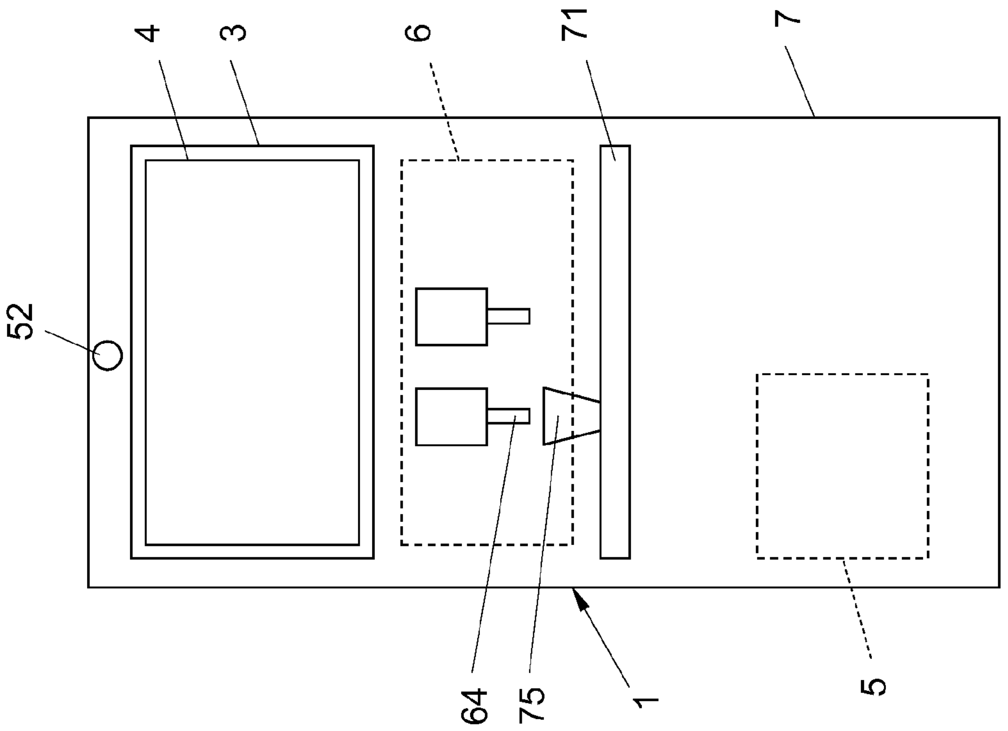
FIG. 2 shows schematically a front view of the device of FIG. 1.

FIG. 2 shows a practical setup of components of the automatic device. Parts therein that correspond to those from FIG. 1 have the same reference. In the practical embodiment shown, the device has a housing 7 for the parts shown in FIG. 1. The housing 7 further has a support 71 for supporting a beaker 75. The beaker 75 can be placed there, for example, by the user or by a placing mechanism.

Figure 3:
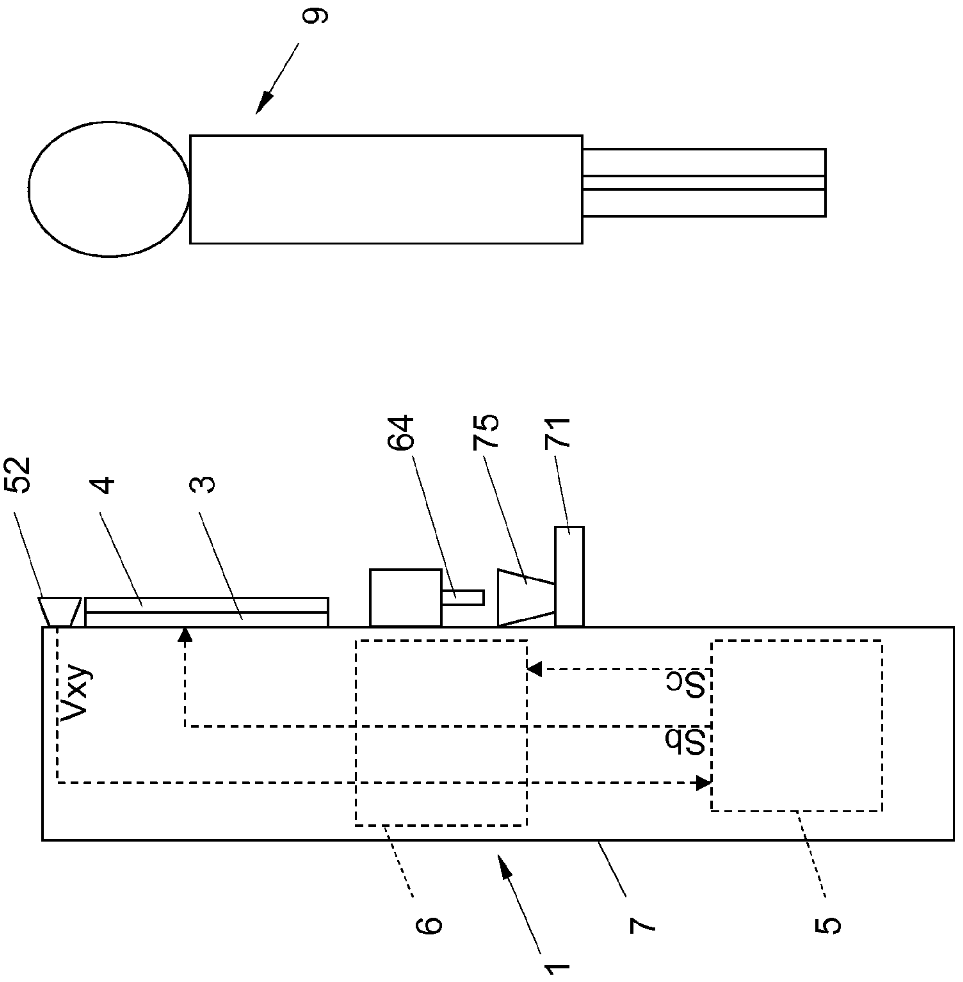
FIG. 3 shows schematically a side view of the device of FIGS. 1 and 2, with a user in front, who operates the device.

FIG. 3 shows schematically a side view of the device 1, with a user 9 opposite thereto. The image input means 52 visually observes the user and generates image signals Vxy which are representative of the visual observation. The operating unit 5 is arranged for generating control signals Sc for the preparation unit 6 of the automatic device as a reaction to the image signals Vxy.

Figure 4:
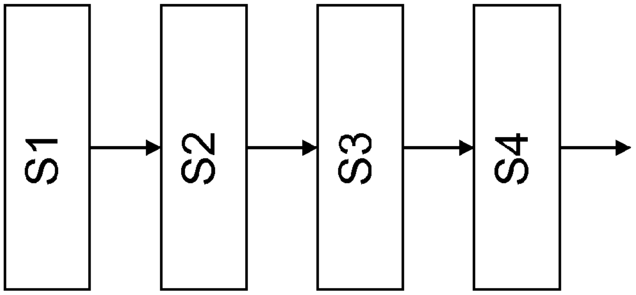
FIG. 4 shows schematically a method for operating the device.

FIG. 4 shows schematically a method according to the invention for controlling an automatic device for preparing a beverage. The method comprises the following steps:

In a first step S1 the user 9 of the device 1 is visually observed. Prior to the first step S1 the device may give the user directions, for example, auditorily or visually. Alternatively, the user 9 may be informed in a different manner of what is necessary to operate the device.

In step S2 image signals Vxy are generated which are representative of the visual observation.

In step S3 control signals Sc are generated for the control of a preparation unit of the automatic device as a reaction to the image signals.

Depending on the generated control signals, in step S4 a beverage is prepared according to a formulation from a plurality of formulations.

In the embodiment shown, during operation, from the generated image signals Vxy an extent of movement of the user 9 is determined. The operating unit 5 only prompts the preparation unit 6 of the automatic device to prepare a beverage if the determined movement satisfies minimum requirements.

To this end, the user is invited by images on the display panel 3. In another embodiment, the user 9 is invited by spoken directions. In yet another embodiment, the user receives both spoken and visual directions.

Figure 5:
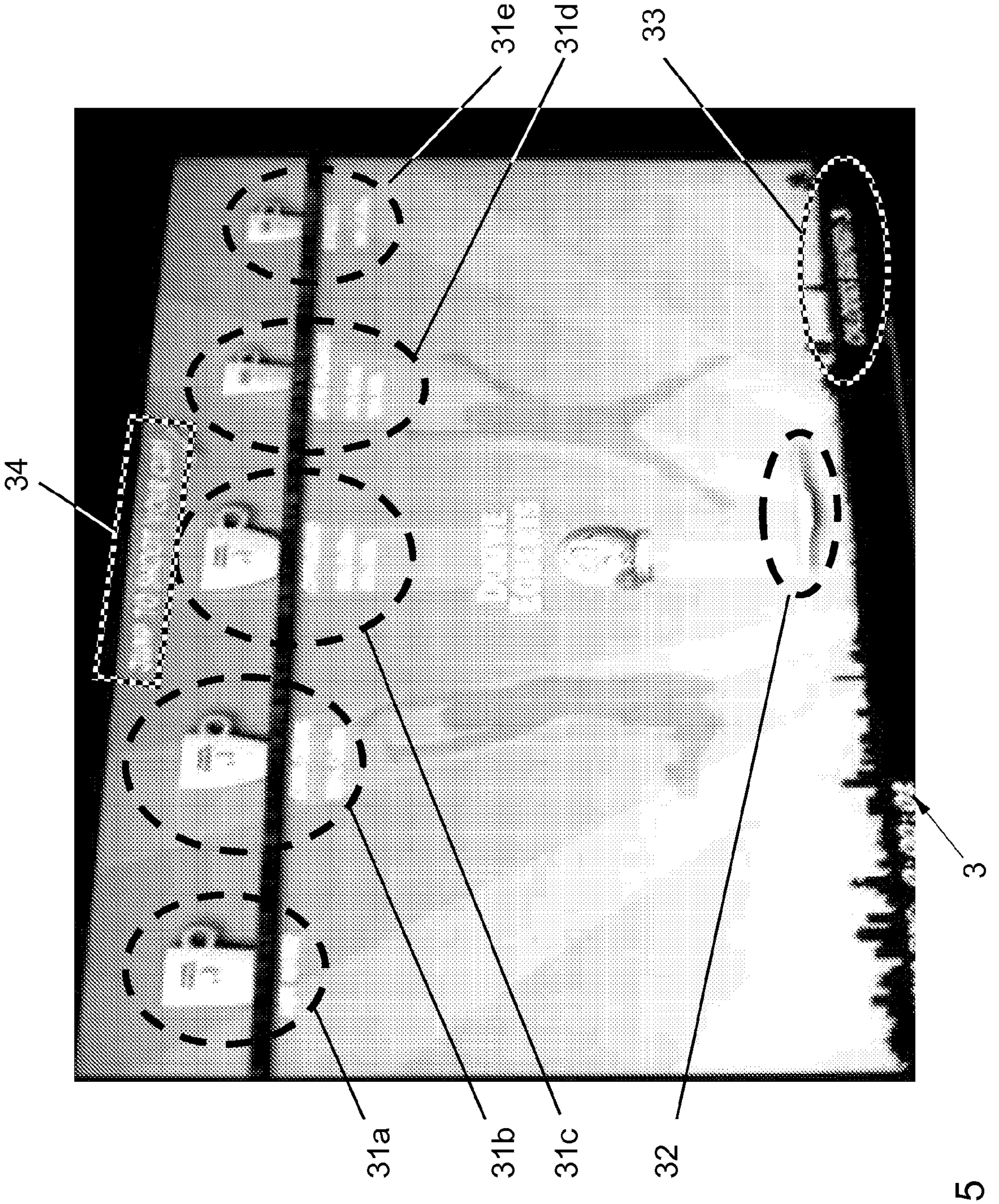
FIG. 5 shows a first possible display of a display panel of the device of FIGS. 1 to 4.

In an embodiment, the user is shown the display of FIG. 5 on the display panel 3. The display shows a series of image elements 31*a*, 31*b*, 31*c*, 31*d*, 31*e* each representing a possible basic composition for the beverage to be prepared. In the embodiment shown, the image elements comprise a picture of a cup or beaker with a description of the basic composition under it. Also, the display panel 3 shows a picture of a saucer 32. On the display panel 3, in a message 34 the user is urged to choose one of the depicted five basic compositions by means of jumping. The camera 52 visually observes this and generates the image signals Vxy which are representative of the visual observation. As a reaction to the image signals Vxy, the operating unit 5 generates control signals Sc for controlling the preparation unit 6 of the device. In the embodiment shown, the operating unit 5 verifies in the process whether the user 9 does in fact jump and does so to a sufficient extent, and hence whether there is an overall vertical movement involved to a sufficient extent. The operating unit 5 confirms to the user that a sufficient extent of jumping has been observed by suggesting in an animation that the depicted cups 31*a-e* fall down. The user 9 can then catch one of the cups by placing the saucer 32 in the correct horizontal position. The user can do so, for example, by choosing his own horizontal position of the place where he/she jumps. In another embodiment, only the falling of the cup that is above the saucer 32 is shown. The falling of the respective cup onto the saucer 32 is made auditorily knowable to the user by the acoustic display means 8 with a sound representative thereof.

Figure 6:
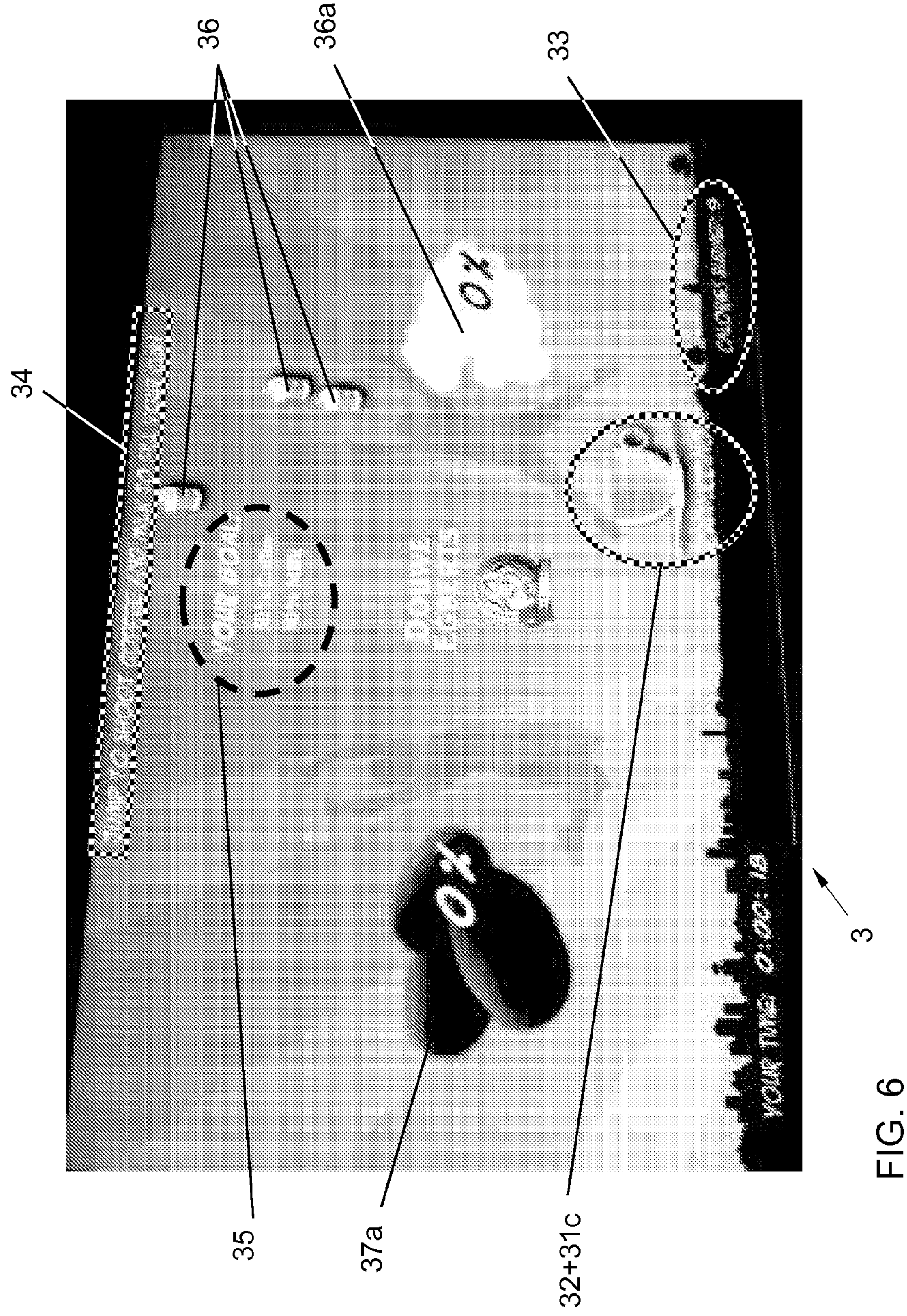
FIG. 6 shows a second possible display of the display panel of the device of FIGS. 1 to 4.

FIG. 6 shows a further step. The display panel 3 now shows that one of the cups, here cup 31*c*, which is representative of cappuccino, has been placed on the saucer 32. Furthermore, it is shown in field 33 that meanwhile the user 9 has burned 9 calories in operating the device. To this end, the control unit has an indication unit for calculating from the image signals an indication of energy spent by the user in providing the input. Through the choice of the basic composition the user 9 has set a goal which is displayed in field 35. In this case, given the choice "cappuccino", the goal is 50% coffee and 50% milk. Through communication 34, the user 9 is encouraged to catch these constituents in the cup 31*c*. By further jumping, the user 9 can make the respective ingredients "fall out of the blue". The user 9 can thereupon catch these ingredients milk 36 and coffee 37 (FIG. 7) by adjusting in horizontal direction the place where he is jumping and hence the place of the cup 31*c* and saucer 32. Fields 36*a*, 37*a* display the result the user 9 has achieved so far.

Figure 7:
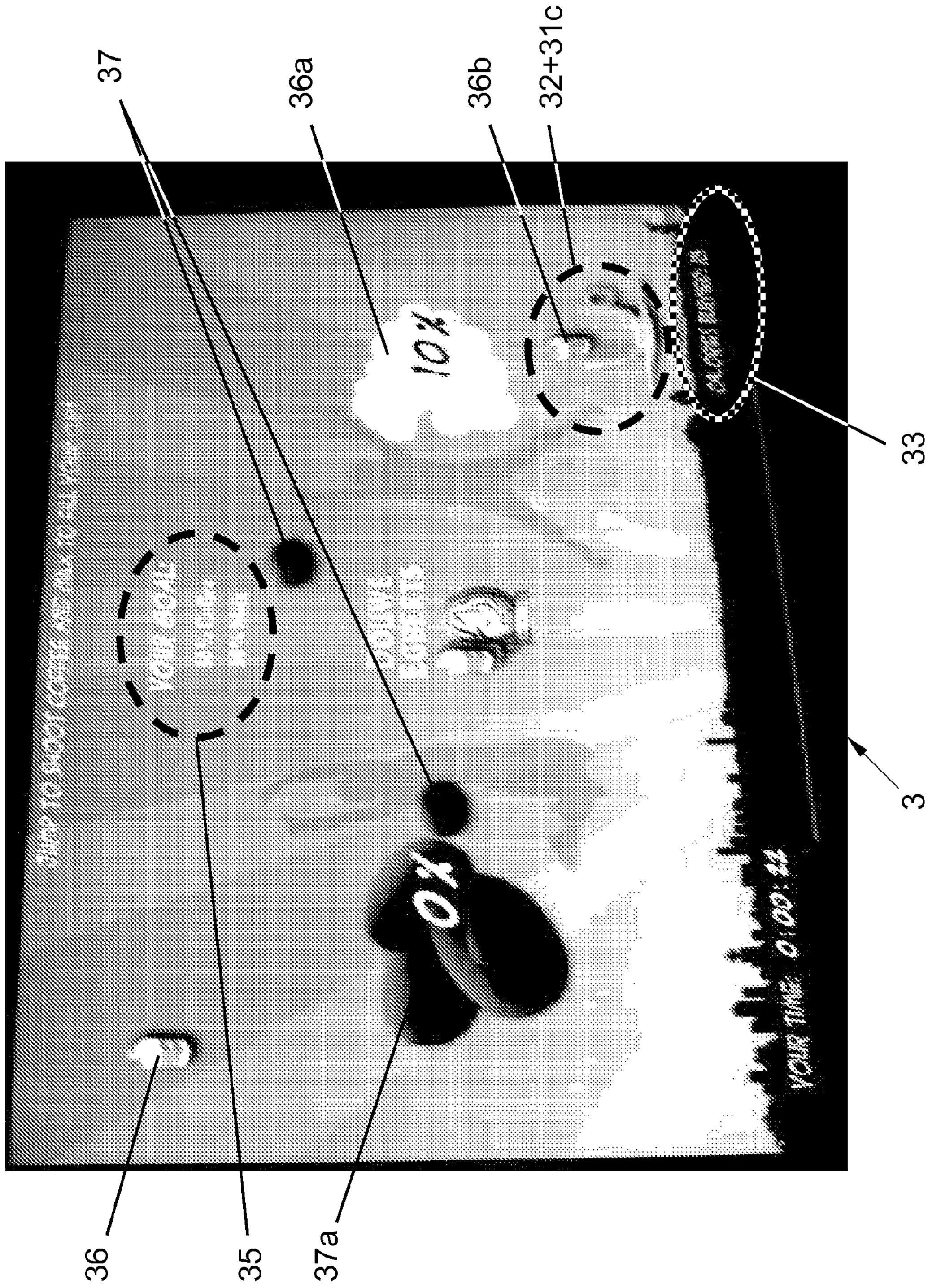
FIG. 7 shows a third possible display of the display panel of the device of FIGS. 1 to 4.

In the situation shown in FIG. 7, the user 9 has just caught in the cup 31*c* a unit 36*b* of milk amounting to 10%, which has also been made knowable auditorily with the aid of the acoustic display means 8. The total amount of milk caught in the cup 31*c* is shown in display field 36*a*. Display field 37*a* shows the amount of coffee caught. In display field 33 it is shown that the user 9 has meanwhile burned 22 calories.

Figure 8:
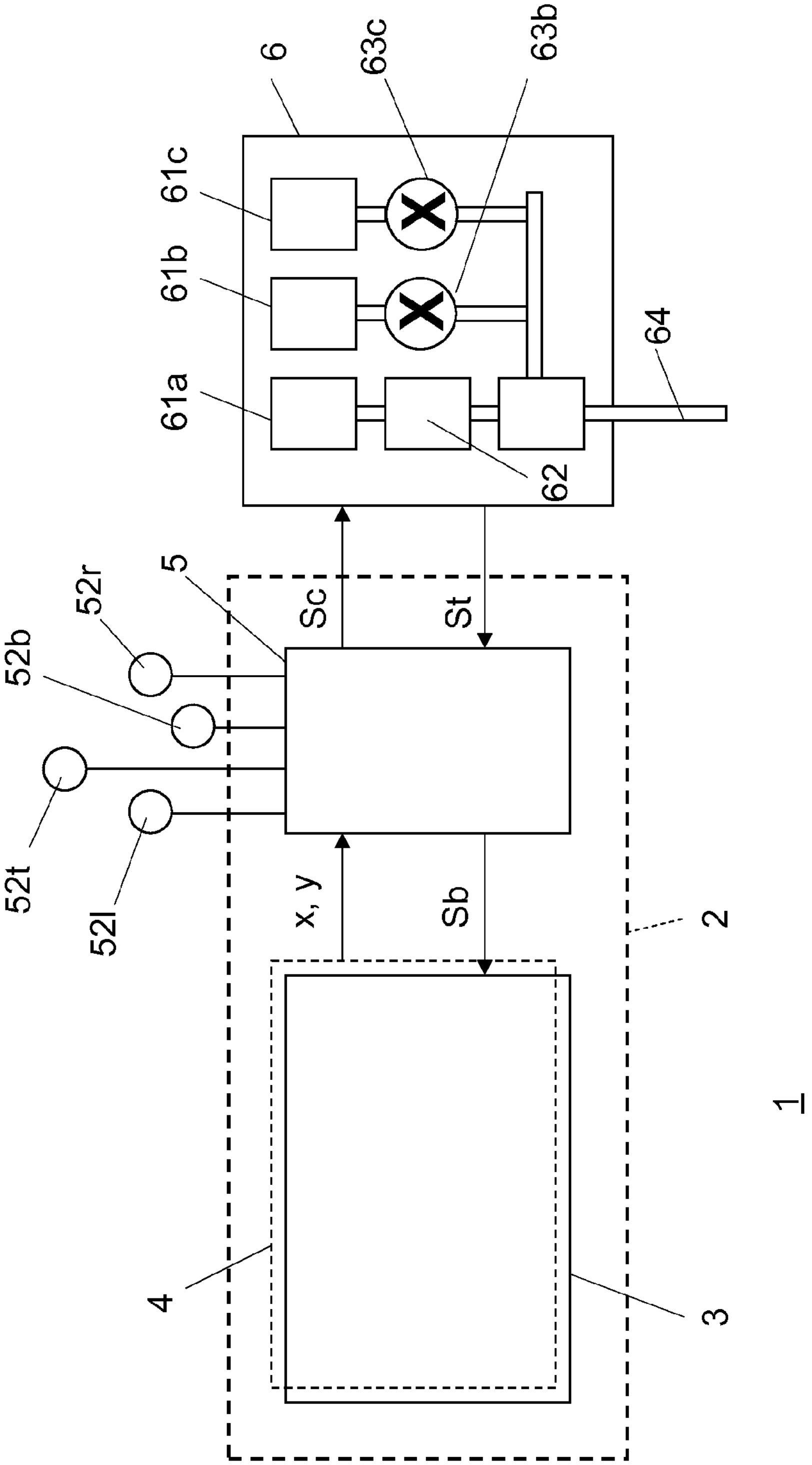
FIG. 8 shows schematically a second embodiment of an automatic device 1 according to the invention for preparing a beverage.

FIG. 8 shows schematically a second embodiment of an automatic device 1 according to the invention. The second embodiment shown differs from the first embodiment in that instead of a camera 52 as input means, the control unit 2 of the device is equipped with sensors 52*b*, 52*t*, 52*l*, 52*r* which detect whether a user is in a respective zone opposite the device. The sensors can then deliver a binary signal with a first value which is indicative of presence in the respective zone and a second value which is indicative of absence in that respective zone. Alternatively, the sensors 52*b*, 52*t*, 52*l*, 52*r* may deliver a multivalent signal which is indicative, for example, of the probability that the user is in the respective zone.

Figure 9:
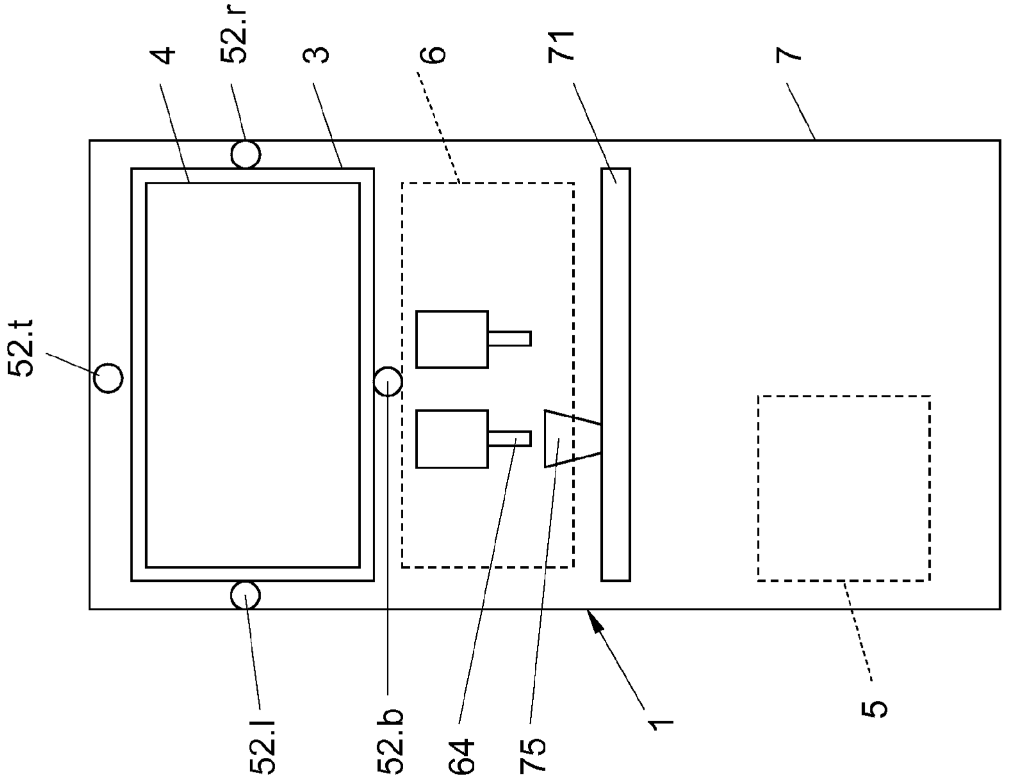
FIG. 9 shows schematically a front view of the device of FIG. 8.

FIG. 9 shows a practical setup of the components of the automatic device in this embodiment. In this case the sensors 52*b*, 52*t*, 52*l*, 52*r* are each placed next to a side of the display panel 3.

Figure 10:
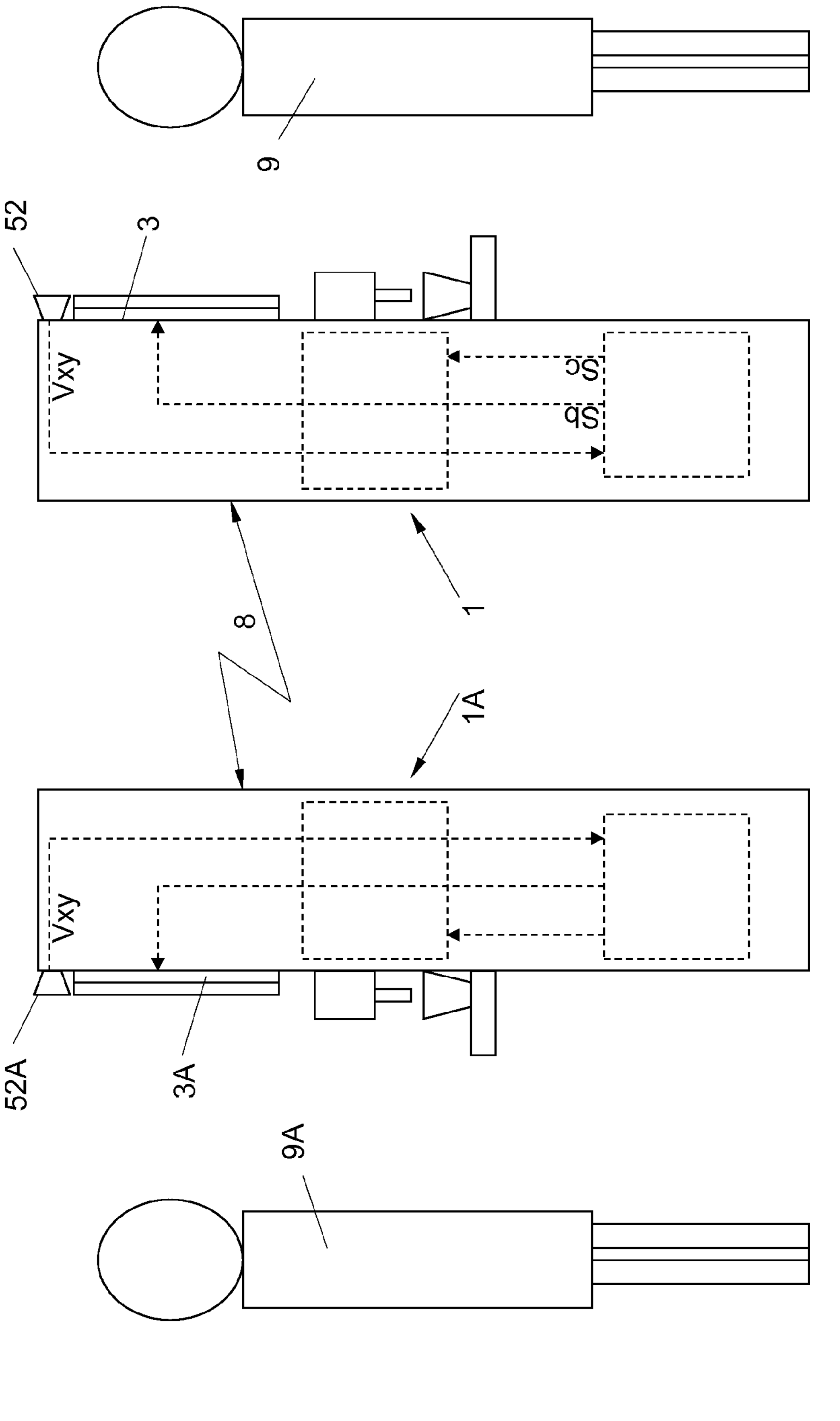
FIG. 10 shows two mutually coupled devices according to the invention.

FIG. 10 shows a group of a first and a second automatic device 1, 1A for preparing a beverage as described with reference to FIGS. 1 to 7. Via a connection 8 the image input means 52 of the first automatic device 1 is coupled with the visual display means 3A of the second automatic device 1A and vice versa. As a result, the users 9 and 9A can communicate with each other via the automatic devices 1, 1A. This is favorable since users regularly gather spontaneously at a device for dosing beverages and so the chance of being able to speak to someone via this route is relatively high.

The operating unit 5 may be implemented with dedicated hardware or as a general signal processor programmed for that purpose. But also a combination of programmable and dedicated hardware may be used. An at least partly programmable implementation of the operating unit has the advantage that the associated software can easily be replaced, e.g., to improve the interaction with the user. The replacement software may be loaded, for example, via the internet.

Figure 11:
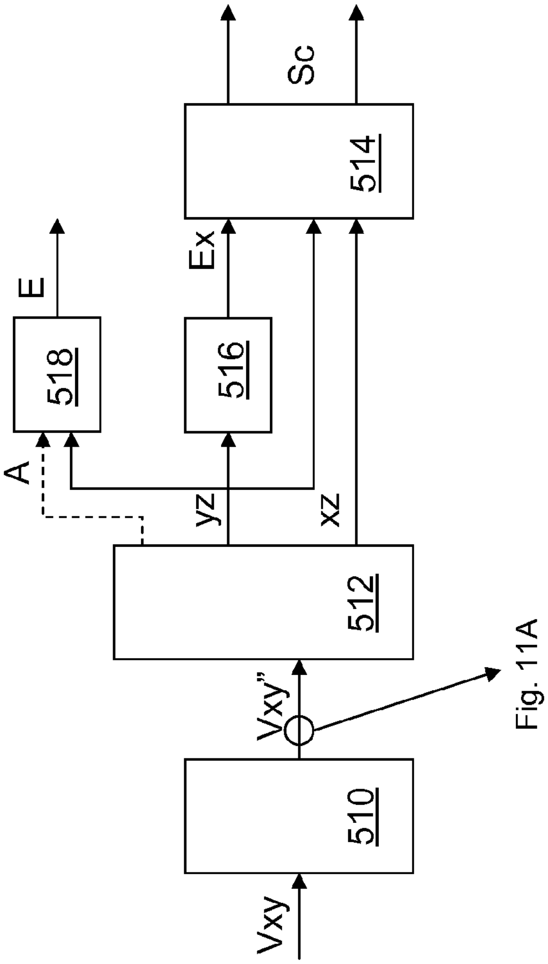
FIG. 11 shows in more detail a part of the device of FIGS. 1 to 4.
Figure 11A:
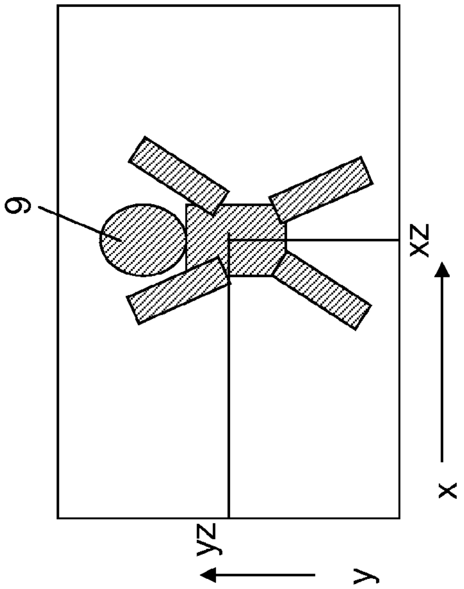
FIG. 11A illustrates a processed image signal in the part mentioned.

FIG. 11 shows schematically a part of an operating unit 5 which on the basis of the image signals Vxy generates control signals Sc. The operating unit 5 has a first module 510 which applies a preprocessing operation to the image signals Vxy and generates a preprocessed image signal Vxy". The preprocessing operation comprises, for example, a denoising of the image signal Vxy and converting the signal into a binary signal Vxy", with a first value in the binary signal indicating that the user is present at the respective coordinate and a second value indicating that the coordinate is part of the background. This is schematically shown in FIG. 11A. The preprocessed signal Vxy" is passed on to an analysis module 512 which determines a center of gravity (xz,yz) from this binary image. The center of gravity (xz,yz) is indicative of the position of the user, xz being the horizontal position of the user and yz being the vertical position of the center of gravity of the user. The position (xz,yz) of the center of gravity of the user is passed on to a control module 514. The vertical position (yz) of the center of gravity is further supplied to an activation module 516. The activation module 516 delivers an activation signal Ex if the vertical position yz of the center of gravity varies to a sufficient extent. Also, the activation module 516 can determine, for example, whether the variation in the vertical position yz of the center of gravity is sufficiently quick and/or sufficiently large. In the above-mentioned example described with reference to FIG. 5, a positive value of the activation signal Ex is followed by a display of the falling of a cup, e.g., 31*c*. The determined coordinate is used for placing the saucer 32. In the situation shown in FIGS. 6 and 7, a positive value of the activation signal Ex is followed by a display of the falling of a coffee bean 37 or a carton of milk 36.

In the embodiment shown in FIG. 11, the operating unit 5 further has an indication unit 518. The indication unit 518 calculates indirectly from the image signals Vxy an indication of energy spent by the user 9 in providing the input. For this, the indication unit 518 makes use of the value of the yz coordinate of the center of gravity calculated by the analysis module 512. The indication unit 518 estimates the energy E spent by the user 9 on the basis of the rate and the extent of the changes in the yz coordinate. Also, the indication unit 518 can make use of an estimate of the body weight of the user. This gives a rough indication of the energy E spent. For a more accurate estimation the indication unit 518 can ask the user to enter his or her weight. In an embodiment, the indication unit 518 estimates the weight of the user from the surface A of the binary representation of the user 9. The estimation of the energy E spent by the user may be still more accurate when the horizontal movements of the user are factored in as well.

Figure 12:
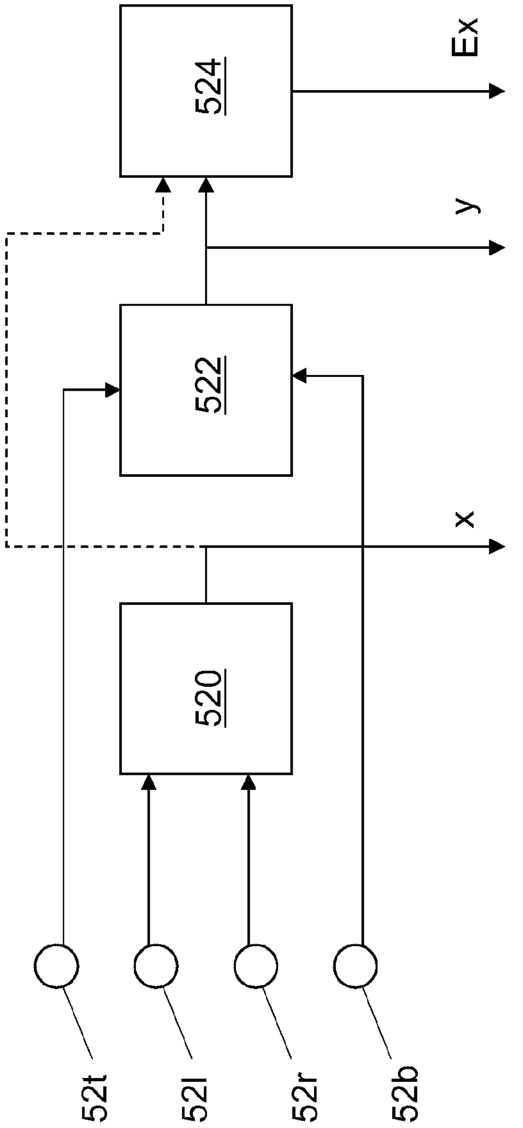
FIG. 12 shows in more detail a part of the device of FIGS. 8 and 9.

FIG. 12 shows an alternative embodiment for a part of the operating unit 5 which can be used, for example, in the embodiment of FIGS. 8 and 9. In the embodiment shown in FIG. 12 the modules 520, 522 respectively calculate an x and a y coordinate. With each detection of a user movement passing in front of the sensor 52*r* the coordinate is increased, and with each detection of a user movement passing in front of the sensor 52*l* the coordinate is decreased. Analogously, with each detection of a user movement passing in front of the sensor 52*t* the coordinate is increased, and with each detection of a user movement passing in front of the sensor 52*b* the coordinate is decreased. The coordinates are, for example, initialized at a value that corresponds to the center of the display panel 3.

In this case, there is provided an activation module 524 which generates an activation signal Ex if the value of the coordinate exhibits sufficient variation. If desired, the activation module 524 could generate the activation signal Ex on the basis of the variations in the value of the coordinate or on the basis of a combination of the two signals.

Although the present invention has been shown in detail on the basis of examples and described in the drawings and the preceding description, the invention is not limited to these examples. Other variations of the exemplary embodiments disclosed may be understood and used on the basis of the description, the drawings and the claims by the skilled person in carrying out the claimed invention. In the claims, the word "comprising" does not exclude other elements or steps. The indefinite article "a" does not exclude plurality. A single processor or unit can in practice carry out functions of different elements recited in the claims. The mere fact that some features are mentioned in mutually different claims does not exclude the possibility of a favorable combination of those features. Reference numerals in the claims are understood not to limit the scope of protection of the claims.

The invention claimed is:

1. An automatic device for preparing a beverage, the automatic device comprising:
- a preparation unit;
- a control unit having a user input enabling a user to choose from a plurality of formulations a formulation for the beverage to be prepared, and an operating unit to control a preparation unit;
- wherein the user input comprises an image input for visually observing the user and for generating image signals which are representative of the visual observation;
- wherein the operating unit generates control signals for the preparation unit of the automatic device as a reaction to the image signals, wherein from the generated image signals an extent of movement of the user is determined and wherein the operating unit only prompts the preparation unit of the automatic device to prepare a beverage based on determining that a center of gravity of the user moves at least a minimum amount.

2. A group of automatic devices of claim 1 comprising at least a first automatic device and a second automatic device, wherein the control unit for each automatic device further comprises a visual display for showing possible choices for the formulations of the beverage to be prepared by the device, wherein the user is enabled to make a selection from the possibilities shown through movements; wherein the image input of the first automatic device is coupled with the visual display of the second automatic device and vice versa.

3. The automatic device of claim 1, wherein for the prompting to prepare a beverage, at least an overall vertical movement of the user is required.

4. The automatic device of claim 1, wherein the operating unit includes an indication unit for calculating from the image signals an indication of energy spent by the user in providing the input.

5. The automatic device of claim 1, further comprising a visual display for showing possible choices for the formulations of the beverage to be prepared by the device, and wherein the user is enabled to make a selection from the possible choices shown through movements.

6. The automatic device of claim 1, further comprising an acoustic display for auditorily representing the result of the input provided by the user.

7. An automatic device for preparing a beverage, the automatic device comprising:

a preparation unit;

a control unit having a user input enabling a user to choose from a plurality of formulations a formulation for the beverage to be prepared, and an operating unit to control a preparation unit;

wherein the user input comprises an image input for visually observing the user and for generating image signals which are representative of the visual observation;

wherein the operating unit comprises a first module operable to preprocess the image signals, an analysis module operable to determines a center of gravity (xz,yz) from the preprocessed image signals, an activation module operable to deliver an activation signal (Ex) to the preparation unit only if a vertical position (yz) of the center of gravity of the user moves at least a minimum amount.

* * * * *